July 28, 1936.  S. R. BERGMAN  2,049,348

COMMUTATING TYPE DYNAMO-ELECTRIC MACHINE

Filed Nov. 2, 1933

Inventor:
Sven R. Bergman,
by Harry E. Dunham
His Attorney.

Patented July 28, 1936

2,049,348

UNITED STATES PATENT OFFICE 2,049,348

COMMUTATING TYPE DYNAMO-ELECTRIC MACHINE

Sven R. Bergman, Nahant, Mass., assignor to General Electric Company, a corporation of New York Application November 2, 1933, Serial No. 696,339

8 Claims. (Cl. 171—123)

My invention relates to commutating type dynamo-electric machines of the type in which two or more independently variable sources of voltage are utilized.

It has been difficult to build a machine of this type in which all the voltages are independently variable over a substantial range. It has also been difficult to secure good commutation throughout the operating range of the machine and independently of the variations in voltage or current. This type of machine presents the further difficulty of securing symmetrical current or flux distribution around the surface of the armature which will prevent unbalanced forces on the bearings.

An object of my invention is to provide a commutator type dynamo-electric machine having a plurality of separate circuits in which the voltage and current in each circuit can be varied independently of the other without affecting commutation.

Another object of my invention is to provide a commutator type dynamo-electric machine having a plurality of circuits in which the voltage and current of each circuit is independent of the other circuits and in which the current distribution over the surface of the armature is symmetrical for all values of current.

Another object of my invention is to provide a commutator type dynamo-electric machine having a plurality of circuits in which the voltage and current in each circuit is independent of the other circuits and in which the flux distribution about the surface of the armature is symmetrical.

Further objects of my invention will become apparent as the description proceeds, and the features of novelty which characterize my invention will be pointed out with particularity in the claims annexed to and forming a part of this specification.

Figure 1:
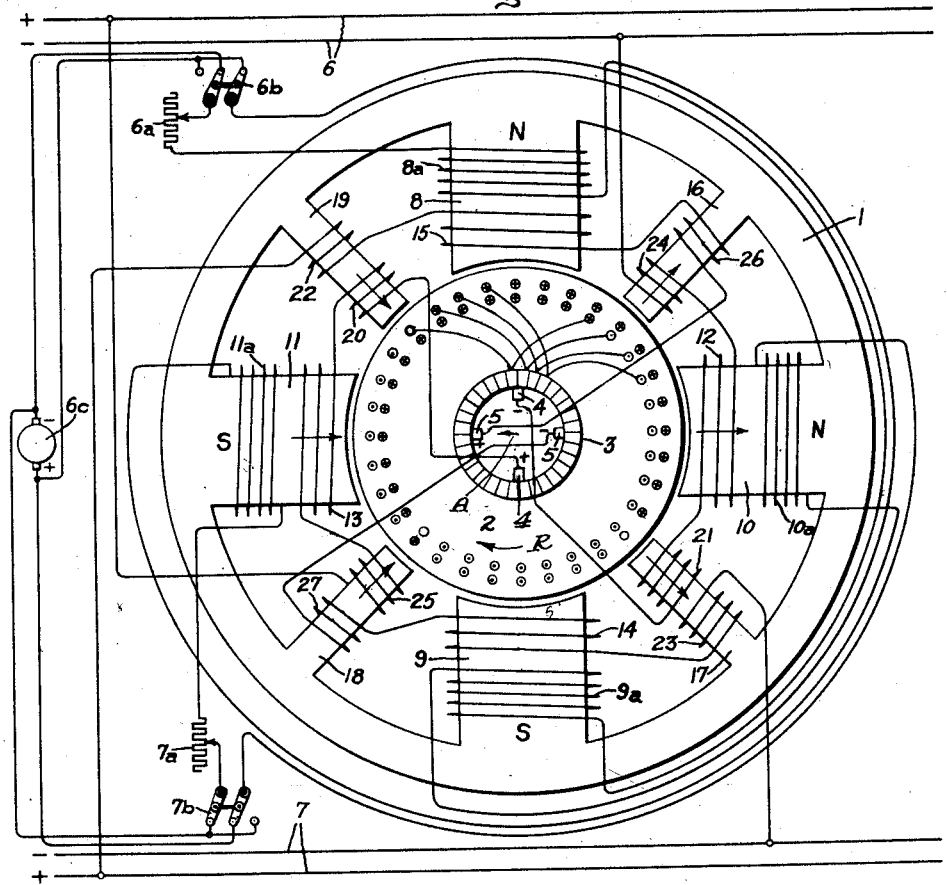
Figure 2:
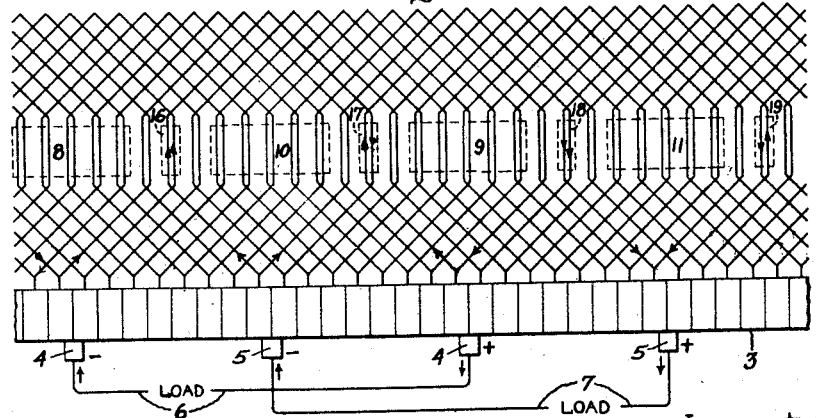

For a better understanding of my invention, reference may be had to the accompanying drawing in which Fig. 1 is a diagrammatic representation of a dynamo-electric machine embodying my invention, and Fig. 2 is a developed view of an armature winding used in this machine.

In the form of my invention illustrated, I have shown a dynamo-electric machine in which the field magnet 1 has four equally spaced main poles 8, 9, 10, and 11 which cooperate with an armature 2 having a commutator 3. Pairs of opposite brushes 4 and 5 bear upon the surface of the commutator and feed current to or from load circuits 6 and 7, respectively. Alternate poles 8 and 9 of the field magnet, which comprise one set of poles, are excited from a suitable source, in this case by windings 8a and 9a connected across exciter 6c through a variable resistance 6a and a reversing switch 6b. Since the remaining poles 10 and 11, which comprise another set of poles, are intermediate and equally spaced from the poles 8 and 9, and therefore are at the same magnetic potential, no flux is produced in the poles 10 and 11 due to the excitation of poles 8 and 9. The set of poles 8 and 9 therefore provides a component of flux which is symmetrically distributed about the surface of the armature and which may be varied without affecting the flux in the remaining main poles. The set of poles 10 and 11 is separately excited by windings 10a and 11a connected across an exciter 6c through a variable resistance 7a and a reversing switch 7b, and provides another symmetrically spaced and independently variable component of flux. By means of the variable resistances 6a and 7a it is possible to independently vary the magnitude of the components of flux produced by the set of poles 8 and 9 and the set of poles 10 and 11. The reversing switches 6b and 7b make it possible to reverse the flux in either set of poles. The reversal of the flux in either set of poles is independent of the flux in the other set of poles. Since both components of flux are symmetrically distributed about the surface of the armature, no unbalanced forces are produced in the bearings of the machine.

The armature has a 4-pole winding which is equal to the number of main poles of the field magnet and for the purpose of illustration is shown as a lap winding of full-pitch coils. In Fig. 1, the current distribution in the armature is shown for the condition in which load circuit 6 carries current, and load circuit 7 is open-circuited. In this condition it is seen that the armature conductors under the poles 8 and 9 carry current in the same direction, and the armature conductors under poles 10 and 11 carry current in opposite directions. So far as load circuit 6 is concerned, the voltage and current appearing in that circuit when the dynamo-electric machine operates as a generator, or the back E. M. F. opposing the voltage of the circuit when the dynamo-electric machine is used as a motor, is due to the conductors under poles 8 and 9 which react with the flux from these poles and is independent of the conductors under poles 10 and 11. The current distribution around the surface of the armature under this condition is symmetrical and no unbalanced forces are exerted on the bearings. Since the flux under poles 8 and 9 is independent of the flux under poles 10 and 11, the voltage of circuit 6 is independent of the excitation of poles 10 and 11. Similarly, the generated voltage or the back E. M. F. and current appearing in load circuit 7 is derived from the conductors under poles 10 and 11 which react with the flux from poles 10 and 11 and is independent of the flux from poles 8 and 9. When both circuits carry current, the current in each conductor is due to the sum of the components of current appearing in the separate load circuits.

The current flowing in the conductors under poles 8 and 9 under the condition shown in Fig. 1 produces a component of armature reaction which has a direction shown by the arrow A. This armature reaction acts on the magnetic circuit which includes field poles 10 and 11 and would tend to change the flux in these poles and thereby change the generated voltage or the back E. M. F. appearing in load circuit 7 in accordance with the current in load circuit 6. To prevent this, field windings 12 and 13 are placed on field poles 10 and 11 and excited in response to the current flowing in load circuit 6 and in such a direction as to oppose the armature reaction due to the current flowing in load circuit 6. Similar windings 14 and 15 are placed on poles 8 and 9 to compensate for the armature reaction due to the current flowing in load circuit 7. The direction of flux produced by the windings 12 and 13 is indicated by arrows on the drawing, and the direction of rotation of the armature is indicated by the arrow R.

To improve the commutation, commutating poles 16, 17, 18, and 19 are placed between the main exciting poles. From an examination of the developed view of the armature winding in Fig. 2 in which it is assumed that both load circuits are carrying current, it is seen that the coils under the commutating field poles carry currents from both load circuits 6 and 7. Under commutating poles 17 and 19, the currents flow in the opposite direction. Under commutating poles 16 and 18, the currents flow in the same direction. In order to provide the proper value of commutating flux to insure good commutation throughout the operating range of the machine, the commutating poles 17 and 19, which cooperate with conductors carrying currents from load circuits 6 and 7 flowing in the opposite direction, are excited by windings 20 and 21 in series with load circuit 6, and windings 22 and 23 in series with load circuit 7. These windings are connected differentially, and provide a commutating flux proportional to the difference of the currents in load circuits 6 and 7. Similarly, commutating field poles 16 and 18, which cooperate with conductors carrying currents from load circuits 6 and 7 flowing in same directions, are excited by coils 24 and 25 in series with load circuit 6, and coils 26 and 27 in series with load circuit 7. These coils are connected cumulatively, and provide a commutating flux which is proportional to the sum of the currents flowing in load circuits 6 and 7. By this arrangement, the commutation of the machine is unaffected by changes in current in the load circuits, and the commutating flux acting on each coil is effective in that coil in proportion to the component of current being commutated.

When the dynamo-electric machine is used as a generator, the voltages and currents appearing in the separate load circuits 6 and 7 may be independently varied by varying resistances 6a and 7a. By means of reversing switches 6b and 7b, the direction of either of the voltages may be changed independently of the other voltage. When the dynamo-electric machine is operated as a motor, the applied voltages from circuits 6 and 7 may be of any desired value and may be so connected that the motor torques produced by currents from these circuits either aid each other or are in opposition.

Although I have described and illustrated a specific embodiment of my invention in which the dynamo-electric machine has two independent circuits, I do not desire my invention to be limited to the particular arrangement shown and described since my invention is applicable to dynamo-electric machines having any number of circuits. In general, in a machine having N independent circuits the total number of sets or pairs of main poles will be equal to N; the armature will have a winding having 2N poles; the number of commutating poles will be equal to 2N; there will be N series windings on each commutating pole excited in response to each component of current; and N—1 series windings on each of the main poles excited in response to the components of current reacting with the other sets of main poles.

What I claim as new and desire to secure by Letters Patent of the United States, is:—

1. A direct-current commutating type dynamo-electric machine comprising a field magnet, having a plurality of sets of main poles, one of said sets of poles comprising alternate main poles and the other of said sets of poles comprising main poles intermediate said alternate poles, said sets of poles being arranged so that a magnetomotive force acting on either of said sets of poles has no effect on the other of said sets of poles, means for producing independent components of flux, said means including means for exciting said sets of poles, an armature having coils reacting independently with each component of flux, means connected to said armature for providing separate circuits through said armature for the components of current in said armature which independently react with each component of flux, and means for exciting one of said sets of poles in opposition to the armature reaction in said set of poles due to the component of current reacting with the other of said sets of poles.

2. A direct-current commutating type dynamo-electric machine comprising a field magnet having a plurality of sets of main poles, one of said sets of poles comprising alternate main poles and the other of said sets of poles comprising main poles intermediate said alternate poles, said sets of poles being arranged so that a magnetomotive force acting on either of said sets of poles has no effect on the other of said sets of poles, means for producing independent components of flux, said means including means for exciting said sets of poles, an armature provided with a winding having the number of poles of the main poles of said field magnet, means for providing separate circuits through said armature for the components of current in said armature which independently react with each component of flux, and means for exciting one of said sets of poles in opposition to the armature reaction due to the component of current reacting with the other of said sets of poles.

3. A direct-current commutating type dynamo-electric machine comprising a field magnet having a plurality of sets of main poles, one of said sets of poles comprising alternate main poles and the other of said sets of poles comprising main poles intermediate said alternate poles, said poles being arranged so that a magnetomotive force acting on either of said sets of poles has no effect on the other of said sets of poles, means for producing independent components of flux, said means including means for exciting said sets of poles, an armature provided with a winding having the number of poles of the main poles of said field magnet, means for providing separate circuits through said armature for the components of current in said armature which independently react with each component of flux, and means including a winding on one of said sets of poles excited in response to the component of current which independently reacts with another of said sets of poles for compensating for the effect of armature reaction on said alternate poles.

4. A dynamo-electric machine comprising a field magnet having a plurality of sets of main poles, one of said sets of poles comprising alternate main poles and the other of said sets of poles comprising main poles intermediate said alternate poles, said sets of poles being arranged so that a magnetomotive force acting on either of said sets of poles has no effect on the other of said sets of poles, means for producing independent components of flux, said means including means for exciting said sets of poles, an armature provided with a winding having the number of poles of the main poles of said field magnet, means for providing separate circuits for the components of current in said armature which independently react with each component of flux, interpoles between each of said main poles, and means for exciting alternate interpoles in accordance with the sum of said components of current and for exciting the remaining interpoles in accordance with the difference of said components of current.

5. An electric rotary converter for converting from a constant voltage-variable direct current supply to a variable voltage direct current supply, or vice versa, comprising in combination, a single armature, a field magnet structure having two sets of main poles one set for the motoring supply circuit and one set for the generated supply circuit, the main poles belonging to one circuit being set alternately between the main poles of the other circuit and both sets of main poles acting on said single armature, two sets of commutator brushes, one set in the motoring circuit and the other set in the generating circuit, at least one armature winding in which the coils have a short span of approximately ninety electrical degrees so that the sides of a coil undergoing commutation at one of the brushes of one circuit are substantially out of the influence of the adjacent main poles belonging to the other circuit, at least one compensating exciting winding on the motoring main poles said compensating winding being connected in series with the generated current and adapted to compensate or neutralize the effect of the armature reaction due to the generated current circulating in the armature and acting on the motoring main poles, and four inter-poles per pair of main poles per circuit, that is, one interpole per main pole of the total number of main poles on the converter.

6. An electric rotary converter for converting from a constant voltage-variable direct current supply to a variable voltage direct current supply, or vice versa, comprising in combination, a single armature, a field magnet structure having two sets of main poles one set for the motoring supply circuit and one set for the generated supply circuit, the main poles belonging to one circuit being set alternately between the main poles of the other circuit and both sets of main poles acting on said single armature, two sets of commutator brushes, one set in the motoring circuit and the other set in the generating circuit, at least one armature winding in which the coils have a short span of approximately ninety electrical degrees so that the sides of a coil undergoing commutation at one of the brushes of one circuit are substantially out of the influence of the adjacent main poles belonging to the other circuit, at least one compensating exciting winding on the motoring main poles said compensating winding being connected in series with the generated current and adapted to compensate or neutralize the effect of the armature reaction due to the generated current circulating in the armature and acting on the motoring main poles, four interpoles per pair of main poles per circuit, that is, one interpole per main pole of the total number of main poles on the converter, and two exciting windings on each of said interpoles, one of these windings being connected in series with the output circuit of the converter and the other in series with the primary or input circuit of the converter.

7. An electric rotary converter for converting from a constant volage-variable direct current supply to a variable voltage direct current supply, or vice versa, comprising in combination, a single armature, a field magnet structure having two sets of main poles one set for the motoring supply circuit and one set for the generated supply circuit, the main poles belonging to one circuit being set alternately between the main poles of the other circuit and both sets of main poles acting on said single armature, two sets of commutator brushes, one set in the motoring circuit and the other set in the generating circuit, at least one armature winding in which the coils have a short span of approximately ninety electrical degrees so that the sides of a coil undergoing commutation at one of the brushes of one circuit are substantially out of the influence of the adjacent main poles belonging to the other circuit, at least one compensating exciting winding on the motoring main poles said compensating winding being connected in series with the generated current and adapted to compensate or neutralize the effect of the armature reaction due to the generated current circulating in the armature and acting on the motoring main poles, at least one compensating winding on each of the generating main poles connected in series with the motoring current and adapted substantially to neutralize or compensate the effect of the armature reaction due to the motoring current circulating in the armature and acting on the generating main poles, and four interpoles per pair of main poles per circuit, that is, one interpole per main pole of the total number of main poles on the converter.

8. An electric rotary converter for converting from a constant voltage-variable direct current supply to a variable voltage direct current supply, or vice versa, comprising in combination, a single armature, a field magnet structure having two sets of main poles one set for the motoring supply circuit and one set for the generated supply circuit, the main poles belonging to one circuit being set alternately between the main poles of the other circuit and both sets of main poles acting on said single armature, two sets of commutator brushes, one set in the motoring circuit and the other set in the generating circuit, at least one armature winding in which the coils have a short span of approximately ninety electrical degrees so that the sides of a coil undergoing commutation at one of the brushes of one circuit are substantially out of the influence of the adjacent main poles belonging to the other circuit, at least one compensating exciting winding on the motoring main poles said compensating winding being connected in series with the generated current and adapted to compensate or neutralize the effect of the armature reaction due to the generated current circulating in the armature and acting on the motoring main poles, at least one compensating winding on each of the generating main poles connected in series with the motoring current and adapted substantially to neutralize or compensate the effect of the armature reaction due to the motoring current circulating in the armature and acting on the generating main poles, four interpoles per pair of main poles per circuit, that is, one interpole per main pole of the total number of main poles on the converter, and two exciting windings on each of said interpoles, one of these windings being connected in series with the output circuit of the converter and the other in series with the primary or input circuit of the converter.

SVEN R. BERGMAN.